(12) United States Patent
Johnson et al.

(10) Patent No.: US 10,274,661 B1
(45) Date of Patent: Apr. 30, 2019

(54) COMPACT WAVEGUIDE BACKLIGHT SYSTEM AND METHOD

(71) Applicant: Rockwell Collins, Inc., Cedar Rapids, IA (US)

(72) Inventors: Ricky J. Johnson, Shellsburg, IA (US); David J. Gulick, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2 days.

(21) Appl. No.: 15/222,489

(22) Filed: Jul. 28, 2016

(51) Int. Cl.
*F21V 8/00* (2006.01)

(52) U.S. Cl.
CPC ......... *G02B 6/0021* (2013.01); *G02B 6/0031* (2013.01); *G02B 6/0051* (2013.01); *G02B 6/0055* (2013.01); *G02B 6/0068* (2013.01); *G02B 6/0085* (2013.01)

(58) Field of Classification Search
CPC .. G02B 6/0021; G02B 6/0031; G02B 6/0051; G02B 6/0055; G02B 6/0068; G02B 6/0085
USPC .......................................................... 362/606
See application file for complete search history.

(56) References Cited

U.S. PATENT DOCUMENTS

| | | | | |
|---|---|---|---|---|
| 6,473,554 B1* | 10/2002 | Pelka | ................... | G02B 6/0018 385/146 |
| 8,641,219 B1* | 2/2014 | Johnson | ............... | G02B 6/0021 362/97.3 |
| 2006/0262564 A1* | 11/2006 | Baba | .................... | G02B 6/0021 362/616 |
| 2007/0242475 A1* | 10/2007 | Minobe | .................. | G02B 5/021 362/608 |
| 2009/0273931 A1* | 11/2009 | Ito | ........................ | G02B 6/0018 362/267 |
| 2010/0073911 A1* | 3/2010 | Ohkawa | ............... | G02B 6/0016 362/97.1 |
| 2010/0079980 A1* | 4/2010 | Sakai | .................. | G02B 6/0016 362/97.1 |
| 2010/0091498 A1* | 4/2010 | Bierhuizen | .......... | G02B 6/0028 362/268 |
| 2011/0249467 A1* | 10/2011 | Boonekamp | ......... | G02B 6/0021 362/555 |
| 2011/0292679 A1* | 12/2011 | Kim | .................. | G02F 1/133615 362/607 |
| 2014/0043853 A1* | 2/2014 | Lavizzari | ............. | G02B 6/0021 362/609 |
| 2014/0098563 A1* | 4/2014 | Kim | ..................... | G02B 6/0076 362/606 |
| 2015/0055369 A1* | 2/2015 | Tarsa | ................... | G02B 6/0078 362/609 |
| 2015/0316703 A1* | 11/2015 | de Sugny | ............ | G02B 6/0031 362/610 |

* cited by examiner

*Primary Examiner* — Bryon T Gyllstrom
(74) *Attorney, Agent, or Firm* — Angel N. Gerdzhikov; Donna P. Suchy; Daniel M. Barbieri

(57) ABSTRACT

A backlight assembly uses one or more lighting elements and a light guide to provide backlight with a reduced number of lighting elements. The light guide is optically coupled with the one or more lighting elements and is configured to receive light at one or more locations, internally reflect the light at the extremities of the light guide, extract the light from the light guide, and radiate the light from a surface of the light guide to backlight an area.

11 Claims, 7 Drawing Sheets

COMPACT WAVEGUIDE BACKLIGHT SYSTEM AND METHOD

BACKGROUND

The inventive concepts disclosed herein relate generally to light panels and particularly to a compact, low cost, high efficiency waveguide backlight.

Current backlights for display assemblies may not provide a desired level of efficiency, may be expensive to implement, may suffer from illumination non-uniformity, and may be bulky and cumbersome. Thus, it would be desirable to provide a backlight for a display assembly that obviates problems associated with current solutions.

SUMMARY

In one aspect, the inventive concepts disclosed herein are directed to a backlight module for a display assembly including a light guide and one or more lighting elements operatively coupled to the light guide.

In a further aspect, the inventive concepts disclosed herein are directed to a display assembly, including a display panel and a backlight module operatively coupled to the display panel. The backlight module includes a light guide operatively coupled to a light source.

In a further aspect, the inventive concepts disclosed herein are directed to a display assembly including a display panel and a backlight module operatively coupled to the display panel. The backlight module includes a light guide and one or more lighting elements operatively coupled to the light guide with a diffuser disposed between the light guide and the display panel.

In a further aspect, the inventive concepts disclosed herein are directed to a method of providing backlight illumination for a display assembly, including a light guide, a plurality of lighting elements operatively coupled to the light guide, and a diffuser operatively coupled to the light guide.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
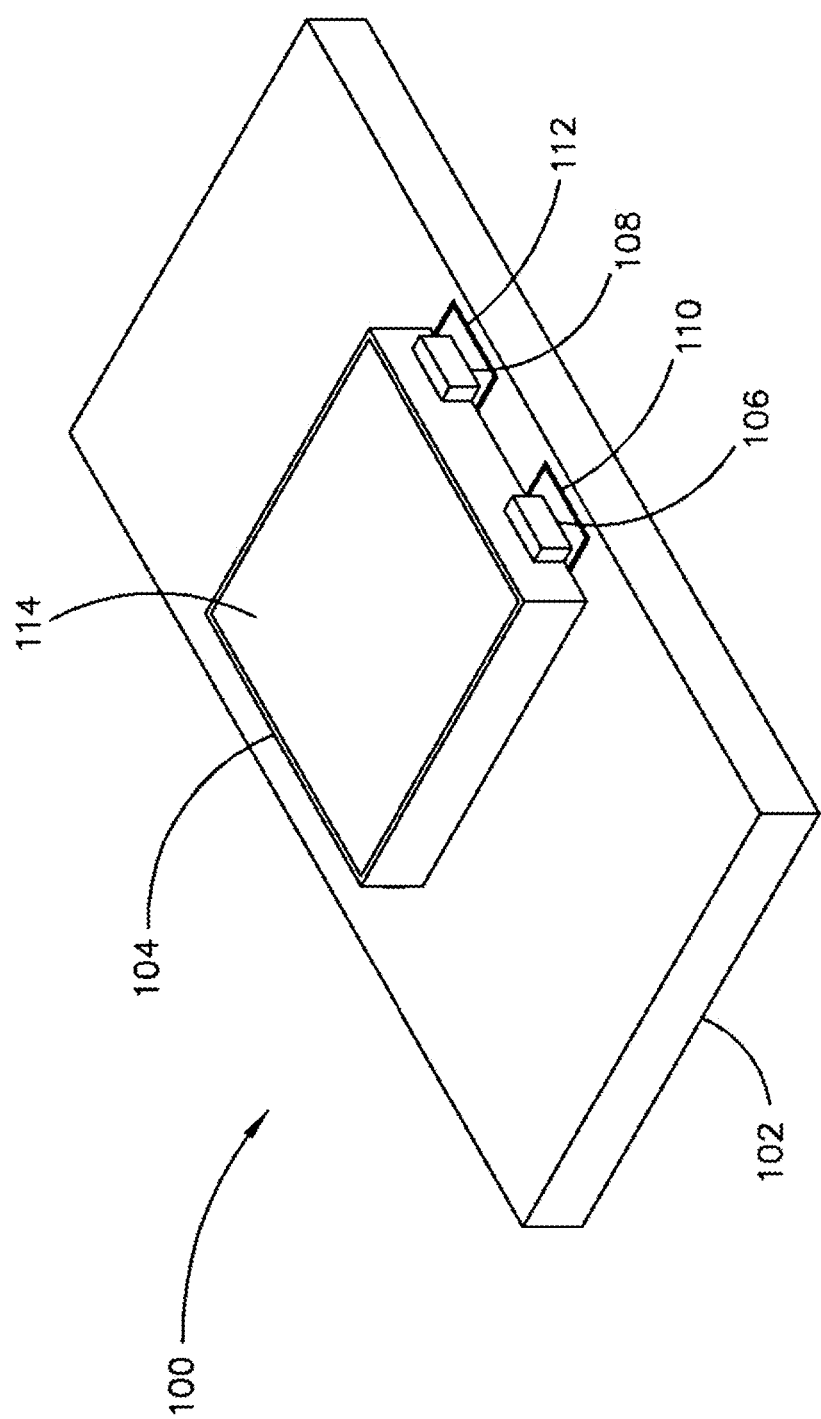
FIG. 1 is a perspective view of an exemplary embodiment of a lighting element including a light emitting diode (LED) mounted on a printed wiring board according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for uniformly backlighting a display with a reduced number of lighting elements. However, skilled artisans will recognize additional light manipulation techniques function within the scope of the inventive concepts disclosed herein.

Referring now to FIG. 1, an exemplary embodiment is shown of a lighting element 100 according to the inventive concepts disclosed herein. A light emitting diode (LED) 104 having a light emitting surface 114 may be mounted to a printed wiring board (PWB) 102. The PWB 102 may be composed of a relatively rigid fiberglass epoxy laminate material with patterned conductive metal areas configured on the board surfaces and possibly inner layers. In some embodiments, the PWB 102 may be composed of a relatively flexible laminate material such as polyimide with patterned conductive metal areas configured on the flexible substrate surfaces and possibly inner layers. Further, in some embodiments, the PWB 102 may be composed of a heat conducting material such as aluminum or ceramic with insulating and patterned conductive areas configured on the surfaces and possibly inner layers.

The LED 104 may be mounted and electrically connected to the PWB 102 using surface mounting technology (SMT), whereby conductive metal pads 110 and 112 on the surface of the PWB 102 are configured to be located beneath metal contacts 106 and 108 on the LED 104. Solder may be applied between the metal pads and metal contacts, heated to its melting point, and cooled to mechanically mount and/or electrically couple the LED 104 to the PWB 102.

Figure 2:
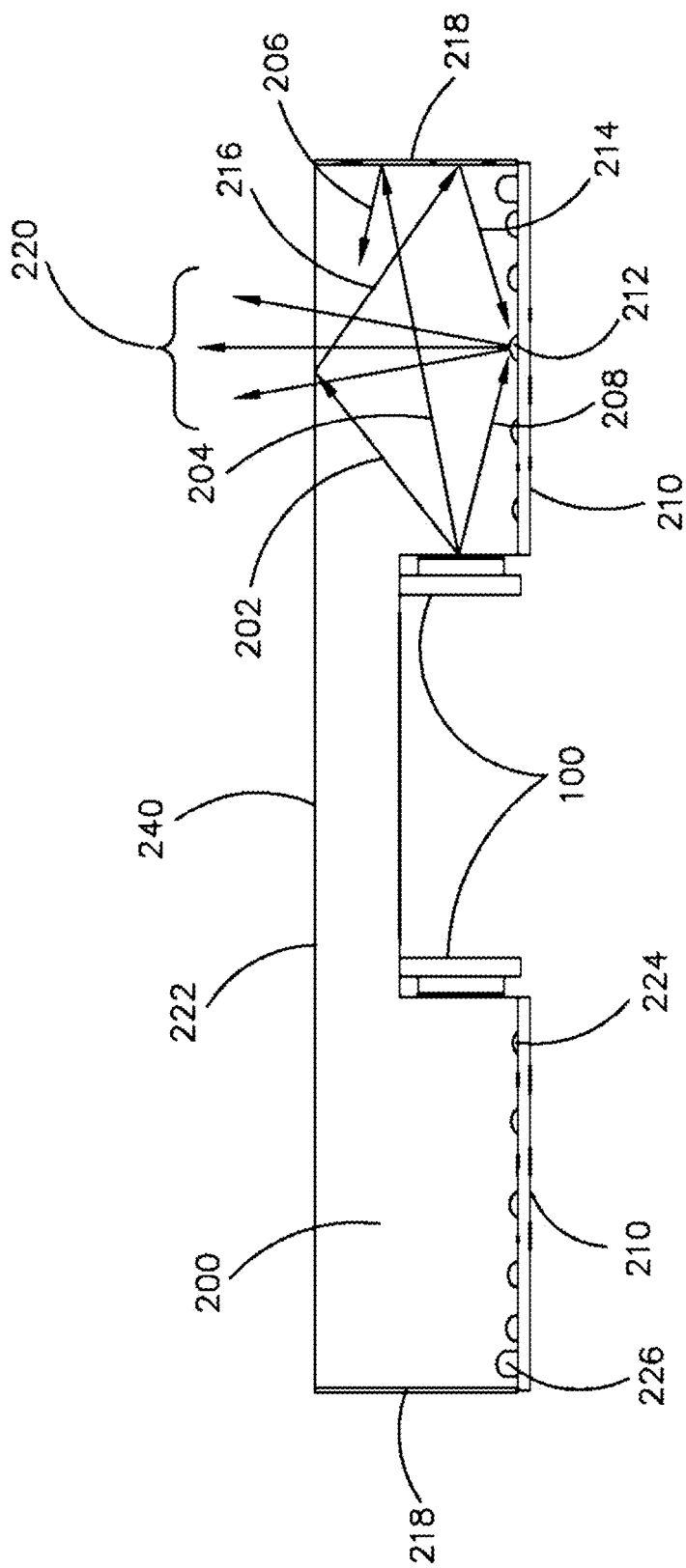
FIG. 2 is a side view of an exemplary embodiment of a light guide for directing light from a plurality of lighting elements to be radiated from a surface of the light guide according to the inventive concepts disclosed herein.

Referring now to FIG. 2, an exemplary embodiment is shown of a light guide 200 for directing light from lighting elements to be radiated from a surface of a light guide according to the inventive concepts disclosed herein. The light guide 200 may be constructed from a machineable or formable optically transparent material such as poly methyl methacrylate (PMMA), also known as acrylic, styrene, optical grade polycarbonate or similar materials. The light guide 200 may be fabricated by one or more processes used for fabrication of objects from plastic materials, including casting, thermoforming, injection molding, machining, and 3D printing. A front surface 222 of the light guide 200 with a central portion 240 may be optically transparent, edge surfaces 218 may be configured with surface or specular reflectors, and a rear surface 210 may be configured with an internal diffuse reflector with light scattering points. The rear surface 210 may be configured to extract light from the light guide 200 in one or more ways, including white paint, reflecting dots, micro-lenses or other texturing methods. In an embodiment, the rear surface 210 may be configured with a plurality of reflecting dots that protrude slightly into the volume of the light guide 200. The spacing of the reflecting dots may be varied so that there is larger space between the reflecting dots 224 in the area closer to a light receiving location of the light guide 200, and smaller space between the reflecting dots 226 in the areas farther from the light receiving location of the light guide 200 to make the relative intensity of the light emitted from the light guide 200 substantially uniform across the emitting front surface 222 of the light guide 200. Alternatively, the size of the reflecting dots may be varied so that the reflecting dots 224 in an area closer to the light receiving location of the light guide 200 are relatively smaller, and the reflecting dots 226 in an area farther from the light receiving location of the light guide 200 are relatively larger to make the relative intensity of the light emitted from the light guide 200 substantially uniform across the emitting front surface 222. In an embodiment, both the spacing and the size of the reflecting dots 224 and 226 may be varied to make the relative intensity of the light emitted from the light guide 200 substantially uniform across the emitting front surface 222 of the light guide 200.

Light may be injected into the light guide 200 by placing one or more lighting elements 100 with light emitting surfaces 114 in optical communication with the light receiving locations of the light guide 200. The one or more lighting elements 100 may be configured to inject light generally parallel to the plane of the light guide 200. Light rays 202, 204 and 208 may radiate from the light source 100 with a radiation angle generally directed toward the edge surfaces 218 of the light guide 200. The light guide 200 may be of any shape, but may be of generally rectangular shape for typical display backlighting applications.

The light ray 202 that is emitted from the light emitting surface 114 of the lighting element 100 may be refracted at the optical interface between air and the light guide 200 material. This may cause the light ray 202 to enter the light guide 200 at an angle closer to the plane of the light guide 200, which may improve the efficiency of injection of light into the light guide 200. The light ray 202 may be totally internally reflected at the front surface 222 of the light guide 200, and may continue as a light ray 216, which may be totally internally reflected by the edge surface 218, where it may continue as a light ray 214. The light ray 204 may be reflected by the edge surface reflector 218, where it may continue as a light ray 206. The light ray 208 may be reflected at a reflecting dot 212 configured on the rear surface 210. The reflection from a reflecting dot 212 may behave like a point emitter and may radiate light 220 through the front surface 222 of the light guide 200. Injected light may be internally reflected indefinitely by total internal reflection at the light guide 200 front surface 222, the edge surfaces 218, and from much of the rear surface 210 if the light does not encounter a reflecting dot 212. Reflection from scattering points on the rear surface 210 and reflecting dots is essentially the main way injected light can exit from the light guide 200 through the front surface 222.

Figure 3:
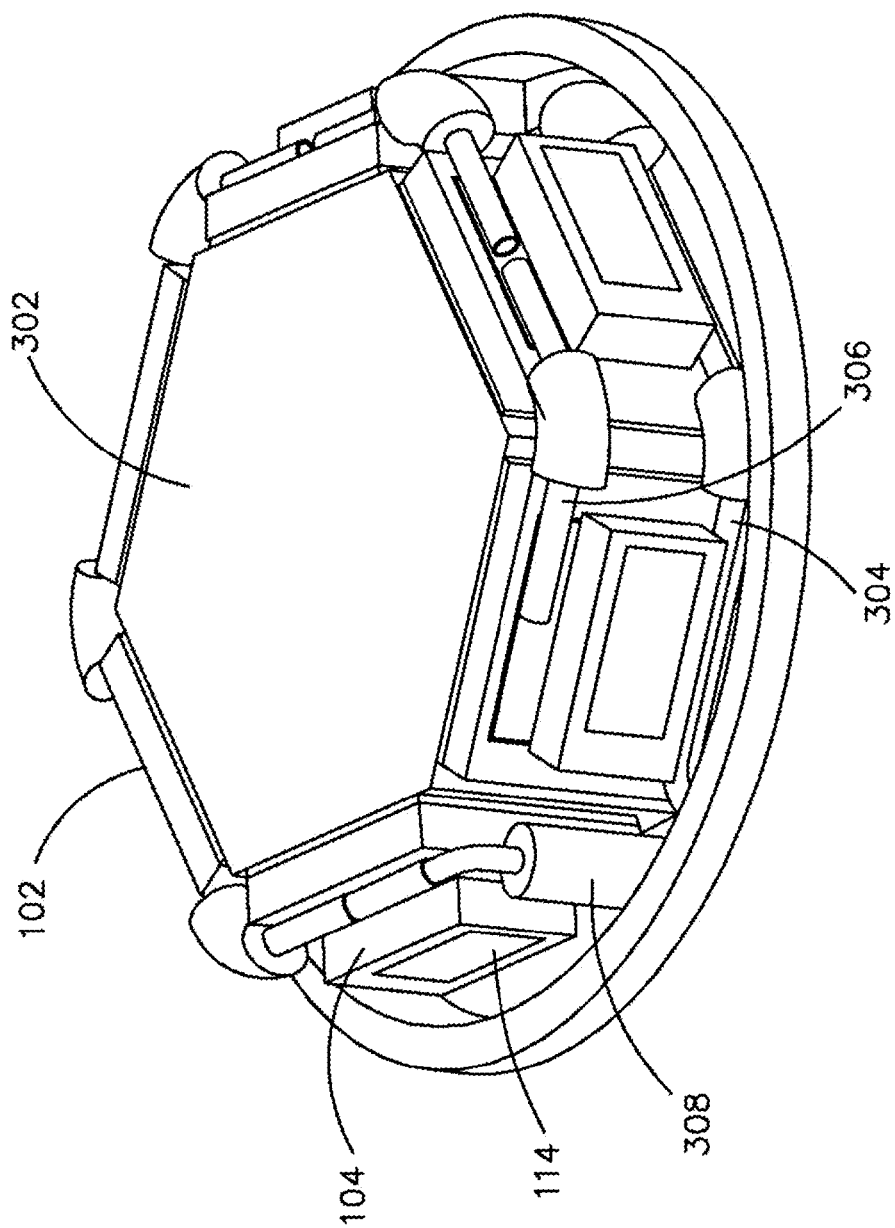
FIG. 3 is a perspective view of an exemplary embodiment of a plurality of lighting elements oriented in a radial configuration to be configured within a light receiving location of a light guide according to the inventive concepts disclosed herein.

Referring now to FIG. 3, a perspective view is shown of an exemplary embodiment of a plurality of lighting elements oriented in a circumferential configuration to be positioned within a light receiving location of a light guide according to the inventive concepts disclosed herein. In FIG. 3, six PWBs 102 of FIG. 1, each having a light emitting diode (LED) 104 with a light emitting surface 114, may be configured to be in thermal contact with a heat conducting substrate 302. The heat conducting substrate 302 may be constructed from a metal selected for good thermal conductivity, such as copper or aluminum. Alternatively, the heat conducting substrate 302 may be constructed from a non-metallic material selected for good thermal conductivity such as carbon nanotubes, ceramic material or diamond. With six PWBs 102, the shape of the heat conducting substrate 302 may be hexagonal with a flat surface for each of the PWBs 102 to make thermal contact to conduct heat from each LED 104 through the PWB 102 to the heat conducting substrate 302. The heat conducting substrate 302 may be configured with a radiating surface to radiate the heat received from the LEDs over an area.

The light emitting surface 114 of each LED may be configured to emit light radially into a light receiving location of the waveguide 200 of FIG. 2. Each of the PWBs 102 may be configured to receive electrical power by electrical conductors 304 and 306. In an embodiment, the PWBs 102 may be electrically connected to each other by electrical conductors 304 and 306, which may be configured as wires that are electrically and mechanically connected to the PWBs 102. In some embodiments, the PWBs 102 may be electrically connected to each other by a flexible laminate material with patterned electrical conductors. The electrical connection to the PWBs 102 from the opposite side of the heat conducting substrate 302 may be made by configuring an electrical conductor 308 to pass through an opening in the heat conducting substrate.

Figure 4:
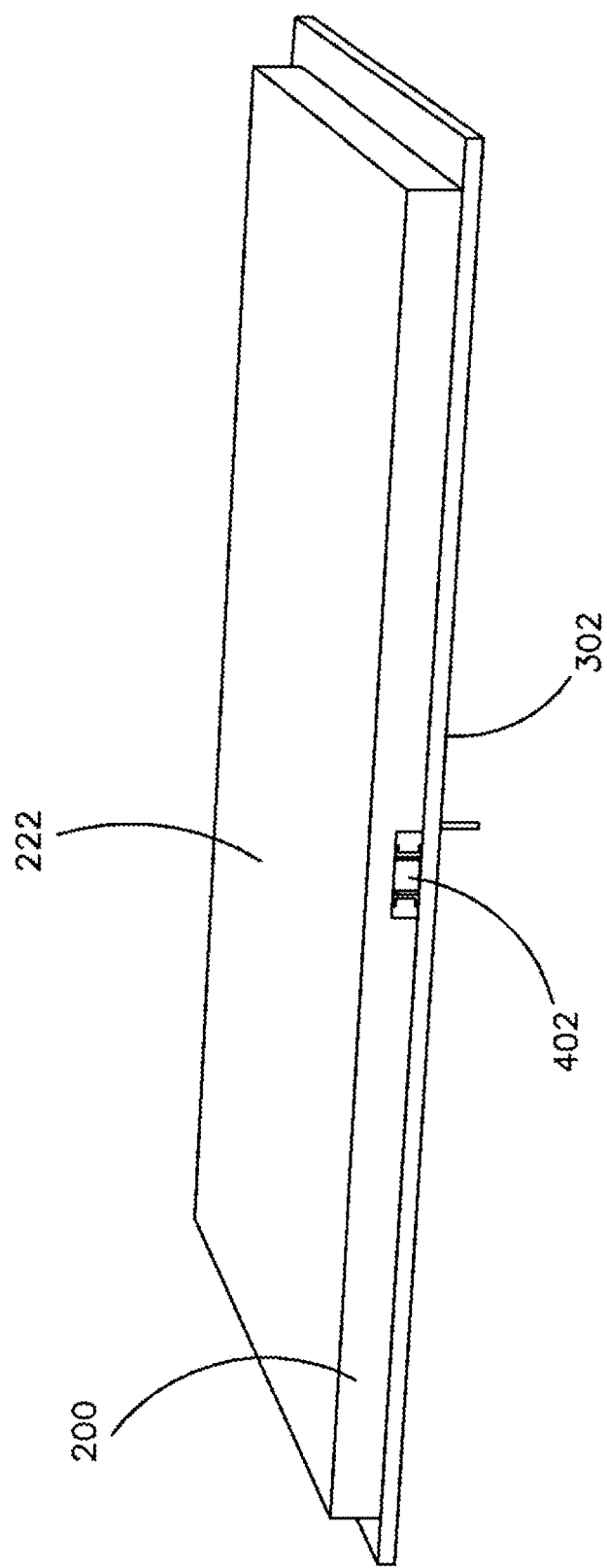
FIG. 4 is a perspective view of an exemplary embodiment of a light guide with one or more lighting elements mounted to a substrate according to the inventive concepts disclosed herein.

Referring now to FIG. 4, a perspective view is shown of an exemplary embodiment of a light guide for directing light from lighting elements to be radiated from a surface of a light guide according to the inventive concepts disclosed herein. Light guide 200 is configured to receive light from a light source 402 and to propagate light from the light source 402 to a light emitting surface 222. The light source 402 may use a single lighting element as shown in FIG. 2, or it may use a plurality of lighting elements as shown in FIG. 3. The light source 402 may be positioned at an interior location of the light guide 200, and may be placed in thermal contact with a heat conducting substrate 302 configured with a radiating surface to radiate the heat received from the lighting elements over the area adjacent to the light guide 200.

Figure 5:
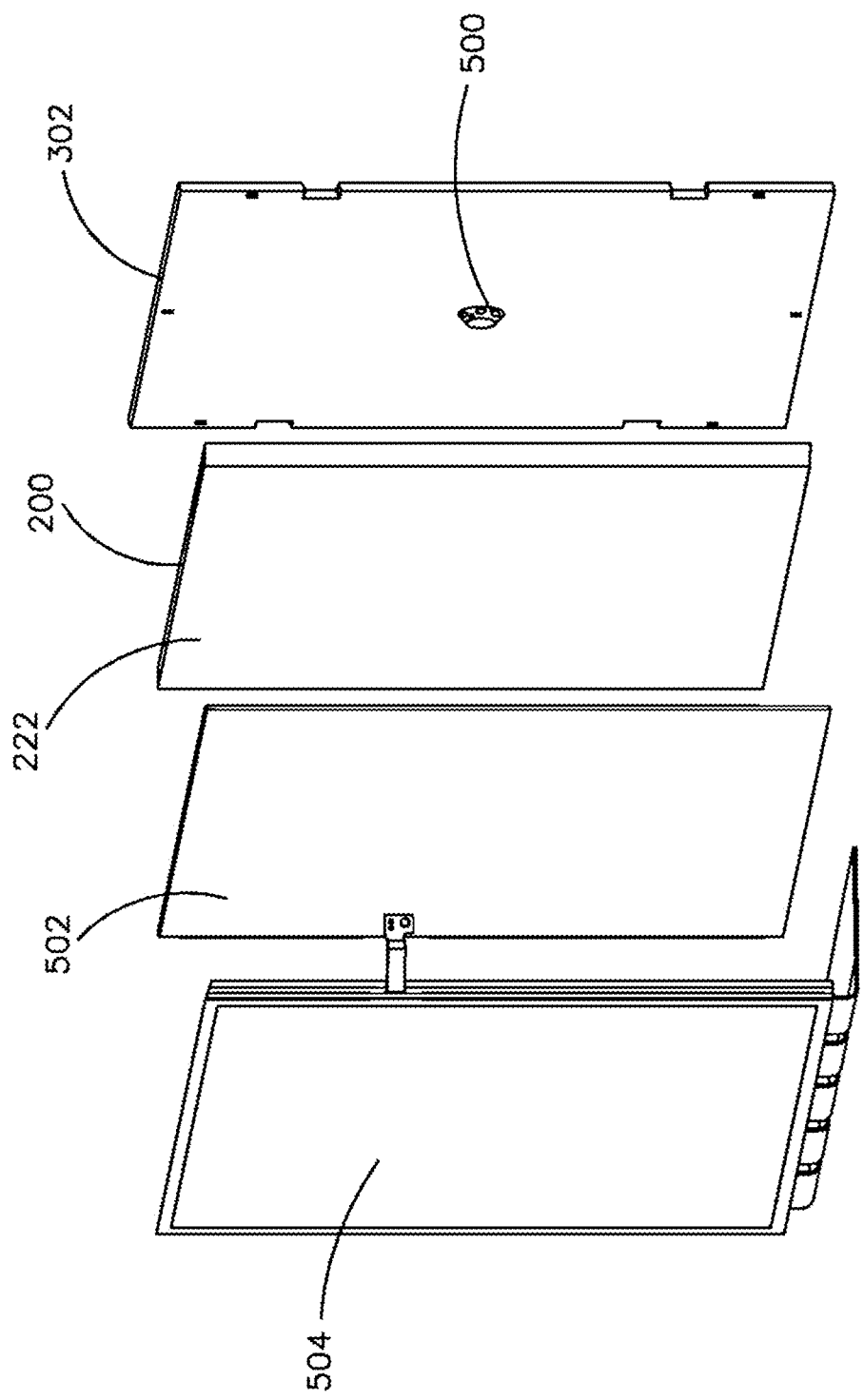
FIG. 5 is am exploded perspective view of an exemplary embodiment of a display assembly including a display panel and a backlight module operatively coupled to the display panel according to the inventive concepts disclosed herein.

Referring now to FIG. 5, an exploded perspective view is shown of an exemplary embodiment of a light guide 200 configured to provide backlighting for a display panel according to the inventive concepts disclosed herein. A light source 500 positioned on a heat conducting substrate 302 may be configured to inject light into the light guide 200 at an interior location of the light guide 200. The light guide 200 may be configured with a light emitting surface 222 to emit light toward a diffuser 502. The light that passes through the diffuser 502 may be directed toward a display panel 504. The heat conducting substrate 302, the light source 500, the light guide 200, the diffuser 502, and the display panel 504 may be configured as a single display assembly.

Figure 6:
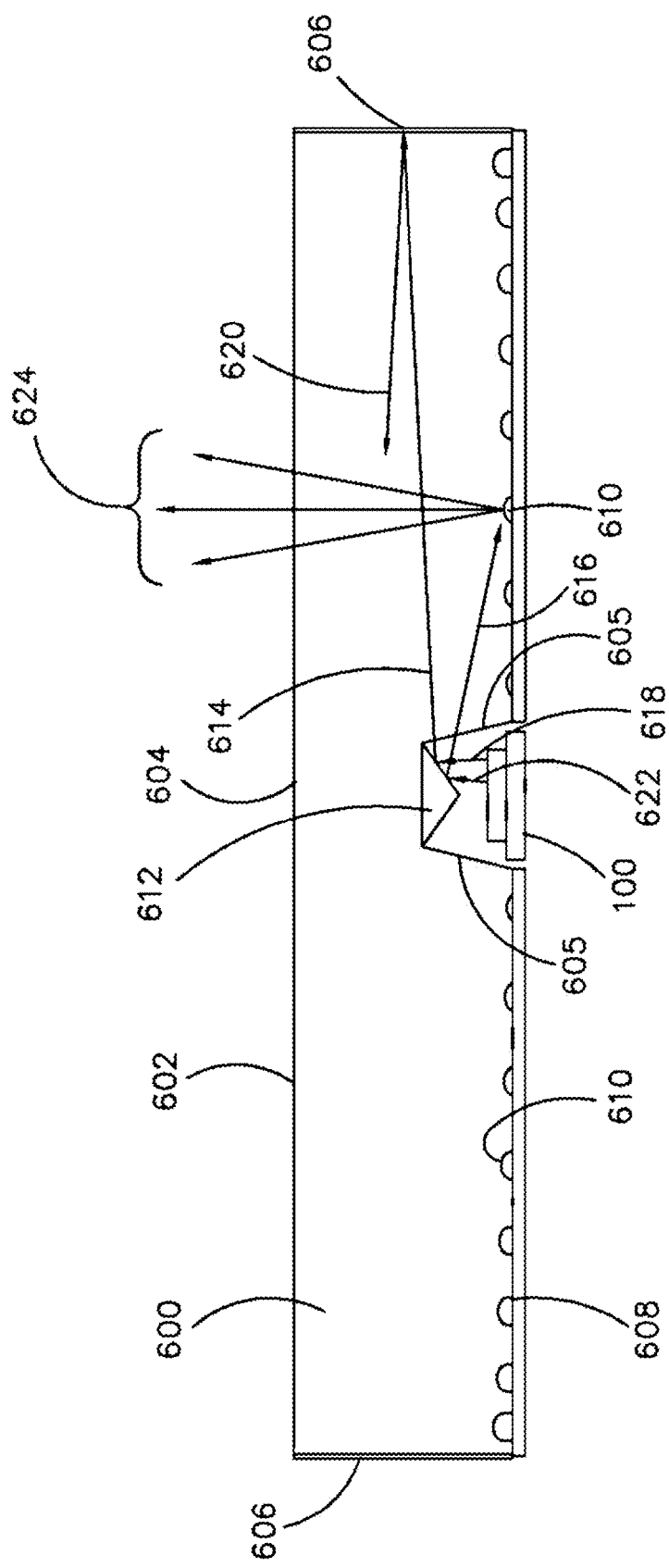
FIG. 6 is a side view of an exemplary embodiment of a single lighting element configured with a reflector within a light receiving location of a light guide according to the inventive concepts disclosed herein.

Referring now to FIG. 6, an exemplary embodiment is shown of a light guide for directing light from a single lighting element to be radiated from a surface of a light guide according to the inventive concepts disclosed herein. A lighting element 100 with light emitting surface 114 may be configured to inject light into a light guide 600. The lighting element 100 may be configured to be in thermal contact with a heat conducting substrate 302 located behind the light guide 600. The light guide 600 may be similar in materials, construction, and fabrication as the light guide 200 of FIG. 2. A front surface 602 of the light guide 600 with a central portion 604 may be optically transparent, edge surfaces 606 may be configured with reflectors, and a rear surface 608 may be configured with an internal reflector with light scattering points. The rear surface 608 may be configured to extract light from the light guide 600 in one or more ways, including white paint, reflecting dots, microlenses or other texturing methods. In an embodiment, the rear surface 608 may be configured with a plurality of reflecting dots 610 that protrude slightly into the volume of the light guide 600. The spacing of the reflecting dots 610 may be varied so that there is larger space between a first set of reflecting dots 610 in the area closer to a light receiving location 605 of the waveguide 600, and smaller space between a second set of reflecting dots 410 in the areas further from the light receiving location 605 of the waveguide 600 to make the relative intensity of the light emitted from the waveguide substantially uniform across the emitting front surface 602 of the waveguide 600. In some embodiments, the size of the reflecting dots 610 may be varied so that reflecting dots 610 in an area closer to the light receiving location 605 of the waveguide 600 are relatively smaller, and reflecting dots 610 in the area farther from the light receiving location 605 of the waveguide 600 are relatively larger to make the relative intensity of the light emitted from the waveguide 600 substantially uniform across the emitting front surface 602 of the waveguide 600. In an embodiment, both the spacing and the size of the reflecting dots 610 may be varied to make the relative intensity of the light emitted from the waveguide substantially uniform across the emitting front surface 422 of the waveguide 400.

Light may be injected into the light guide 600 by placing a lighting element 100 at an interior location of the light guide 600. A reflector 612 may be configured to reflect light from the lighting element 100 toward the light receiving locations 605 of the light guide 600. The shape of the reflector 612 may be chosen to reflect a larger portion of the light from the lighting element 100 toward predetermined areas of the light guide 600 to provide substantially uniform illumination from the radiating surface 602. The lighting element 100 may be configured to inject light toward the reflector 612, which may reflect the light radially from the lighting element 100 toward the light guide 600. The optical path in the light guide 600 within which the reflector 612 and the lighting element 100 is placed may be shaped so that the light may be refracted at the optical interface between air and the light guide material to cause light rays 614 and 616 to enter the light guide 600 at an angle closer to the plane of the light guide 600, which may improve the efficiency of injection of light into the light guide 600. The light guide 600 may be of any shape, but may be of generally rectangular shape for typical display backlighting applications.

A light ray 618 may be emitted from the lighting element 100 toward the reflector 612, continue as a light ray 614 toward the edge surface reflector 606, and continue as a light ray 620, which may be reflected by the light guide front surface 602 due to total internal reflection. A light ray 622 may be emitted from the lighting element 100 toward the reflector 612, and continue as a light ray 616 toward the rear surface 608 and reflecting dots 610, where it may be reflected at a reflecting dot 610. As in FIG. 2, the reflection at reflecting dot 610 may behave like a point emitter and radiate light 624 out of the front surface 602. Injected light may be internally reflected indefinitely by total internal reflection at the front surface 602 and by edge surface reflectors 606. Reflection from scattering points on the rear surface 608 and the reflecting dots 610 is essentially the main way injected light can exit the light guide 600.

Figure 7:
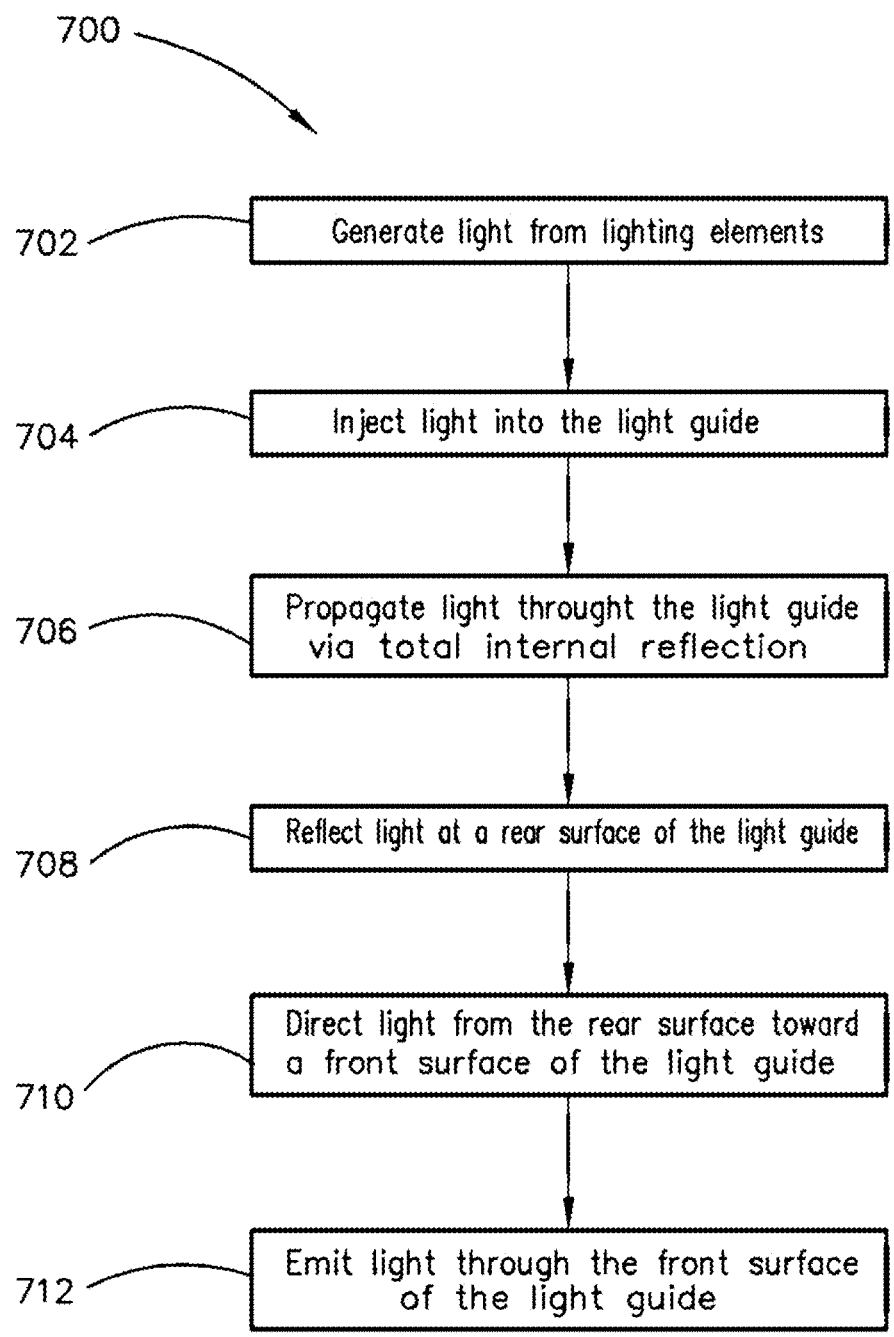
FIG. 7 is a diagram of an exemplary embodiment of a method of providing backlight for a display assembly according to the inventive concepts disclosed herein.

Referring now to FIG. 7, an exemplary embodiment of a method 700 according to the inventive concepts disclosed herein. The method 700 may include one or more of the following steps. It is to be understood that embodiments of methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A step 702 may include generating light from one or more lighting elements.

A step 704 may include injecting light from the one or more lighting elements into a light guide.

A step 706 may include propagating the light through the light guide by total internal reflection.

A step 708 may include reflecting the light at a rear surface of the light guide.

A step 710 may include directing the light from the rear surface toward a front surface of the light guide.

A step 712 may include emitting the light through the front surface of the light guide.

As will be appreciated from the above, an area illumination system according to embodiments of the inventive concepts disclosed herein may provide uniform light over an area for backlighting a display panel with a reduced number of lighting elements, which may reduce cost and complexity, and increase reliability.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A backlight assembly, comprising:
    at least one lighting element configured to emit light, wherein the at least one lighting element is at least one light emitting diode (LED), each of the at least one LED mounted to a printed wiring board (PWB); and
    a light guide optically coupled with the at least one lighting element;
    the light guide comprising:
        a front surface having a central portion;
        at least one rear surface comprising a plurality of shaped reflectors configured to direct light toward the front surface;
        at least one edge surface; and
        at least one light receiving surface, in a spaced-apart opposing relationship with the at least one edge surface such that the at least one light receiving surface is proximal to the central portion of the front surface and the at least one edge surface is distal from the central portion of the front surface, wherein the at least one light receiving surface is a recess within the light guide, wherein the at least one light receiving surface is configured to change the angle of the light from one or more of the at least one lighting element;
        the front surface, the at least one rear surface, the at least one edge surface, and the at least one light receiving surface cooperating with one another to define a light conducting volume such that
        light injected into the light guide at the at least one light-receiving surface propagates through the light conducting volume via total internal reflection, encounters the at least one rear surface, and is directed toward the front surface and emitted through the front surface to backlight an area of a display panel,
    wherein the plurality of shaped reflectors are obloid protrusions into the light conducting volume separated by a distance from one another,
    wherein the plurality of shaped reflectors are configured with varying spacing to emit light with uniform brightness over the front surface,
    wherein the obloid protrusions increase in height as a distance from a particular lighting element of the at least one lighting element increases.

2. The assembly of claim 1, wherein the at least one lighting element is configured to emit light radially toward the at least one light receiving surface.

3. The assembly of claim 2, wherein the at least one lighting element is configured with a heat conducting substrate.

4. The assembly of claim 1, wherein the at least one lighting element is configured with a reflector to emit light radially toward the at least one light receiving surface.

5. The assembly of claim 1, wherein the front and rear surfaces are parallel to one another.

6. The assembly of claim 1, wherein the plurality of shaped reflectors comprise a first set of reflectors positioned relatively closer to the at least one light receiving surface and separated by a first distance from one another, and a second set of reflectors positioned relatively further from the at least one light receiving surface and separated from one another by a second distance smaller than the first distance.

7. A display assembly, comprising:
    a display panel; and
    a backlight assembly, comprising:
        at least one lighting element configured to emit light, wherein the at least one lighting element is at least one light emitting diode (LED), each of the at least one LED mounted to a printed wiring board (PWB); and
        a light guide optically coupled with the at least one lighting element;
        the light guide comprising:
            a front surface;
            a rear surface comprising a plurality of shaped reflectors configured to direct light toward the front surface;
            at least one peripheral reflecting edge surface; and
            at least one interior light receiving surface, wherein the at least one interior light receiving surface is a recess within the light guide, wherein the at least one interior light receiving surface is configured to change the angle of the light from one or more of the at least one lighting element;
            the surfaces cooperating with one another to define a light conducting volume such that
            light injected into the light guide at the at least one light-receiving surface propagates through the light conducting volume via total internal reflection, encounters the rear surface, and is directed toward the front surface and emitted through the front surface to backlight an area,
        wherein the plurality of shaped reflectors are obloid protrusions into the light conducting volume separated by a distance from one another,
        wherein the plurality of shaped reflectors are configured with varying spacing to emit light with uniform brightness over the front surface,
        wherein the obloid protrusions increase in height as a distance from a particular lighting element of the at least one lighting element increases.

8. A method for backlighting a display panel, comprising:
generating light from one or more lighting elements, wherein the one or more lighting elements are at least one light emitting diode (LED), each of the at least one LED mounted to a printed wiring board (PWB);
injecting the light into a light guide, comprising;
   a front surface;
   a rear surface comprising a plurality of shaped reflectors configured to direct light toward the front surface;
   one or more peripheral reflecting edge surfaces; and
   one or more interior light receiving surfaces, wherein the at least one interior light receiving surface is a recess within the light guide, wherein the at least one interior light receiving surface is configured to change the angle of the light from one or more of the at least one lighting element;
   the surfaces cooperating with one another to define a light conducting volume;
propagating light through the light conducting volume via total internal reflection;
reflecting light at the rear surface;
directing light toward the front surface; and
emitting light through the front surface to backlight an area of the display panel,
wherein the plurality of shaped reflectors are obloid protrusions into the light conducting volume separated by a distance from one another,
wherein the plurality of shaped reflectors are configured with varying spacing to emit light with uniform brightness over the front surface,
wherein the obloid protrusions increase in height as a distance from a particular lighting element of the at least one lighting element increases.

9. The method of claim 8, wherein the one or more lighting elements are configured to emit light radially toward the light receiving surfaces.

10. The method of claim 8, wherein a single lighting element of the one or more lighting elements is configured with a reflector to emit light radially toward the light receiving surfaces.

11. The method of claim 8, wherein the shaped reflectors are configured with larger space between the reflectors that are closer to the light receiving surfaces, and smaller space between the reflectors that are more distant from the light receiving surfaces.

* * * * *